(12) United States Patent
Moss et al.

(10) Patent No.: US 12,251,040 B2
(45) Date of Patent: Mar. 18, 2025

(54) MOUNTING BRACKET

(71) Applicant: House of Atlas, LLC, Evanston, IL (US)

(72) Inventors: Jason Moss, Libertyville, IL (US); Matthew Berman, Chicago, IL (US)

(73) Assignee: House of Atlas, LLC, Evanston, IL (US)

( * ) Notice: Subject to any disclaimer, the term of this patent is extended or adjusted under 35 U.S.C. 154(b) by 65 days.

(21) Appl. No.: 18/164,430

(22) Filed: Feb. 3, 2023

(65) Prior Publication Data

US 2024/0263735 A1 Aug. 8, 2024

(51) Int. Cl.
| A47H 1/142 | (2006.01) |
| A47H 1/02 | (2006.01) |
| A47H 1/122 | (2006.01) |
| A47H 1/14 | (2006.01) |
| F16M 13/02 | (2006.01) |

(52) U.S. Cl.
CPC ............... *A47H 1/142* (2013.01); *A47H 1/02* (2013.01); *A47H 1/122* (2013.01); *A47H 1/14* (2013.01); *F16M 13/02* (2013.01)

(58) Field of Classification Search
CPC .......... A47H 1/142; A47H 1/14; A47H 1/122; A47H 1/02; F16M 13/02
See application file for complete search history.

(56) References Cited

U.S. PATENT DOCUMENTS

| 241,991 A | 5/1881 | Jones |
| 331,850 A | 12/1885 | Umstadter |
| 446,675 A | 2/1891 | Glidden |
| 568,628 A | 9/1896 | Henry |
| 726,950 A | 5/1903 | Larson |
| 732,821 A | 7/1903 | Bitner |
| 762,594 A | 6/1904 | Christopher |
| 828,503 A | 8/1906 | Powell |
| 940,711 A | 11/1909 | Eells |
| 969,051 A | 8/1910 | Garraway |
| 999,675 A | 8/1911 | Schmitz |

(Continued)

FOREIGN PATENT DOCUMENTS

FR 2898795 9/2007

OTHER PUBLICATIONS

Pictures of Better Homes & Gardens, Smart Rods Ball Adjustable Drapery Rod, Oil-Rubbed Bronze Finish and Instructions (with English translation), known to be publicly available before Mar. 15, 2018 but not before Sep. 16, 2015, 18 pages.

(Continued)

*Primary Examiner* — Eret C McNichols
(74) *Attorney, Agent, or Firm* — Fitch, Even, Tabin & Flannery LLP

(57) ABSTRACT

A bracket for attachment to a structure is provided that includes a base having a supporting portion and a mounting portion extending at an angle to the supporting portion. The supporting portion has an upper support surface. The mounting portion defines one or more first mounting holes sized to receive a fastener for mounting the base to a structure. The one or more first mounting holes extend upwardly at an oblique angle through the mounting portion. The bracket further includes a support arm sized to contact the upper support surface of the base and extend through a gap of the base.

33 Claims, 5 Drawing Sheets

(56) References Cited

U.S. PATENT DOCUMENTS

| | | |
|---|---|---|
| 1,004,471 A | 9/1911 | Rose |
| 1,024,349 A | 4/1912 | Mattern |
| 1,033,440 A | 7/1912 | Moffat |
| 1,052,447 A | 2/1913 | Armstrong |
| 1,104,545 A | 7/1914 | Reitz |
| 1,115,997 A | 11/1914 | Withrow |
| 1,120,935 A | 12/1914 | Hammers |
| D47,004 S | 2/1915 | Martin |
| 1,187,366 A | 6/1916 | Sylvester |
| 1,333,163 A | 3/1920 | Eddy |
| D55,157 S | 5/1920 | Dubish |
| 1,341,535 A | 5/1920 | Becker |
| 1,384,246 A | 7/1921 | Durnell |
| 1,445,372 A | 2/1923 | Jene |
| 1,451,764 A | 4/1923 | Dick |
| 1,461,855 A | 7/1923 | Kroesser |
| 1,492,210 A | 4/1924 | Kelly |
| 1,498,849 A | 6/1924 | London |
| 1,525,895 A | 2/1925 | Walter, V |
| 1,530,167 A | 3/1925 | Friend |
| 1,593,114 A | 7/1926 | Wyatt |
| 1,596,506 A | 8/1926 | Morgan |
| 1,658,815 A | 2/1928 | Oskamp |
| D76,109 S | 8/1928 | Vermillion |
| 1,805,784 A | 5/1931 | Peterson |
| 1,809,216 A | 6/1931 | Quandt |
| D101,104 S | 7/1936 | Bushey |
| 2,135,159 A | 11/1938 | Zbock |
| 2,151,223 A | 3/1939 | Nayman, Sr. |
| 2,234,099 A | 3/1941 | Westfall |
| 2,240,225 A | 4/1941 | Place |
| 2,288,303 A | 6/1942 | Ryan |
| 2,293,168 A | 8/1942 | Pirone |
| 2,374,787 A | 5/1945 | Spiegel |
| 2,386,854 A | 10/1945 | Hilton |
| 2,474,434 A | 6/1949 | Mentz |
| 2,484,855 A | 10/1949 | Press |
| 2,644,191 A | 7/1953 | Meyer |
| 2,720,373 A | 10/1955 | Bell |
| 2,725,989 A | 12/1955 | Burkey |
| 2,783,014 A | 2/1957 | Kenney |
| 2,789,783 A | 4/1957 | Jones |
| 2,848,184 A | 8/1958 | Kennedy |
| 2,859,879 A | 11/1958 | Rogers |
| 2,964,280 A | 12/1960 | Rinaldi |
| 3,049,327 A | 8/1962 | Caudell |
| 3,104,086 A | 9/1963 | Salzmann |
| 3,199,823 A | 8/1965 | Stall |
| 3,219,302 A | 11/1965 | Smith |
| 3,289,992 A | 12/1966 | Brooks |
| 3,312,442 A | 4/1967 | Moeller |
| 3,430,908 A | 3/1969 | Kowalczyk |
| 3,704,851 A | 12/1972 | Cormier |
| 3,724,085 A | 4/1973 | Wentworth |
| 3,778,955 A | 12/1973 | Close |
| 3,857,538 A | 12/1974 | Williamson |
| 3,912,211 A | 10/1975 | Topf |
| D242,986 S | 1/1977 | Inglis |
| 4,039,136 A | 8/1977 | Dehart |
| 4,060,905 A | 12/1977 | Light |
| D251,180 S | 2/1979 | Mader |
| 4,140,294 A | 2/1979 | Zwarts |
| D253,162 S | 10/1979 | Sheehan |
| 4,226,395 A | 10/1980 | Bellinger |
| 4,291,996 A | 9/1981 | Gilb |
| 4,316,546 A | 2/1982 | Varon |
| 4,322,050 A | 3/1982 | Roach |
| 4,455,007 A | 6/1984 | Varon |
| 4,473,957 A | 10/1984 | Faulkner |
| 4,509,713 A | 4/1985 | Hogg |
| D290,931 S | 7/1987 | Powell |
| 4,684,095 A | 8/1987 | Athey |
| 4,708,311 A | 11/1987 | Clausen |
| 4,878,528 A | 11/1989 | Kobayashi |
| 5,028,030 A | 7/1991 | Lewis |
| 5,054,728 A | 10/1991 | Nigro, Jr. |
| 5,103,574 A | 4/1992 | Levy |
| 5,193,775 A | 3/1993 | Wagnon |
| 5,195,570 A | 3/1993 | Marocco |
| 5,398,900 A | 3/1995 | Schober |
| 5,577,700 A | 11/1996 | Williams |
| D376,755 S | 12/1996 | Cox |
| 5,678,703 A | 10/1997 | Sawyer |
| D389,035 S | 1/1998 | Smiley |
| 5,802,729 A | 9/1998 | O'Brien |
| 5,803,425 A | 9/1998 | Mccoy, II |
| D408,722 S | 4/1999 | Sartini |
| D411,951 S | 7/1999 | Baranski |
| 5,927,675 A | 7/1999 | Kratish |
| 5,979,848 A | 11/1999 | Kuthy |
| 5,996,791 A | 12/1999 | Bibby |
| D420,567 S | 2/2000 | Laga |
| 6,233,877 B1 | 5/2001 | Monroe |
| 6,325,349 B1 | 12/2001 | Breaux |
| 6,357,716 B1 | 3/2002 | Kratish |
| D455,334 S | 4/2002 | Ivankovic |
| 6,367,755 B1 | 4/2002 | Arena |
| 6,371,423 B1 | 4/2002 | Miller |
| 6,371,427 B1 | 4/2002 | Johnson |
| 6,409,140 B1 | 6/2002 | Kratish |
| 6,450,233 B1 | 9/2002 | Becker |
| D464,013 S | 10/2002 | Adams |
| 6,471,175 B1 | 10/2002 | Kratish |
| 6,481,584 B1 | 11/2002 | Cantley |
| 6,554,237 B1 | 4/2003 | Weber |
| D478,804 S | 8/2003 | Titus |
| 6,640,512 B1 | 11/2003 | Kinnaman |
| 6,695,276 B2 | 2/2004 | Skorka |
| 6,739,065 B2 | 5/2004 | Hofmeister |
| 7,128,124 B2 | 10/2006 | Bibby |
| D542,897 S | 5/2007 | Harwanko |
| 7,210,243 B2 | 5/2007 | Schmidt |
| 7,322,552 B1 | 1/2008 | Lin |
| 7,448,507 B1 | 11/2008 | Abernathy, Jr. |
| D586,647 S | 2/2009 | Didehvar |
| 7,509,752 B2 | 3/2009 | Schmidt |
| D602,344 S | 10/2009 | Olien |
| D611,328 S | 3/2010 | Hanley |
| 7,798,463 B2 | 9/2010 | Morgenroth |
| 7,802,769 B1 | 9/2010 | Lindsey |
| 7,861,989 B2 | 1/2011 | Cross |
| D638,282 S | 5/2011 | Robinson |
| 8,011,635 B2 | 9/2011 | Aleo |
| D646,957 S | 10/2011 | Syed |
| 8,056,873 B1 | 11/2011 | Hanely |
| 8,069,507 B2 | 12/2011 | Didehvar |
| D658,043 S | 4/2012 | Burr |
| 8,185,981 B2 | 5/2012 | Didehvar |
| 8,214,938 B2 | 7/2012 | Hanley |
| 8,231,093 B2 | 7/2012 | Tran |
| D667,295 S | 9/2012 | Harwanko |
| 8,297,576 B2 | 10/2012 | Mcleod |
| D670,522 S | 11/2012 | Cittadino |
| D670,944 S | 11/2012 | Cittadino |
| D672,178 S | 12/2012 | Walker |
| D672,990 S | 12/2012 | Lindo |
| D672,991 S | 12/2012 | Cittadino |
| 8,341,775 B2 | 1/2013 | Didehvar |
| 8,356,782 B2 | 1/2013 | Robichaud |
| D678,754 S | 3/2013 | Burr |
| 8,418,975 B1 | 4/2013 | Burr |
| D681,422 S | 5/2013 | Lindo |
| D681,423 S | 5/2013 | Walker |
| D684,037 S | 6/2013 | Harwanko |
| D691,029 S | 10/2013 | Didehvar |
| D691,030 S | 10/2013 | Lindo |
| D691,031 S | 10/2013 | Harwanko |
| D693,209 S | 11/2013 | Walker |
| D696,573 S | 12/2013 | Didehvar |
| 8,640,890 B2 | 2/2014 | Schiller |
| D707,535 S | 6/2014 | Burr |
| 8,814,114 B2 | 8/2014 | Baines |
| 8,844,886 B2 | 9/2014 | Mejia |
| 8,851,435 B1 | 10/2014 | Bastien |

(56) References Cited

U.S. PATENT DOCUMENTS

| | | |
|---|---|---|
| 8,869,999 B2 | 10/2014 | Lindo |
| 8,978,228 B2 | 3/2015 | Didehvar |
| 8,979,911 B2 | 3/2015 | Martineau |
| 9,009,878 B2 | 4/2015 | Baines |
| 9,021,627 B2 * | 5/2015 | Parker .................. A47K 3/38 |
| | | 211/105.4 |
| 9,107,529 B2 | 8/2015 | Didehvar |
| 9,131,795 B2 | 9/2015 | Didehvar |
| 9,216,045 B2 | 12/2015 | Martineau |
| D746,667 S | 1/2016 | Vaccaro |
| 9,271,592 B2 | 3/2016 | Didehvar |
| 9,474,421 B2 | 10/2016 | Baines |
| 9,486,913 B2 | 11/2016 | Thieman |
| 9,532,663 B2 | 1/2017 | Nilsson |
| 9,726,304 B2 | 8/2017 | Heath |
| D805,880 S | 12/2017 | Bright |
| D811,205 S | 2/2018 | Hanley |
| D813,021 S | 3/2018 | Hanley |
| D813,022 S | 3/2018 | Hanley |
| 10,047,903 B2 | 8/2018 | Bruno |
| 10,064,512 B2 | 9/2018 | Mcmillion |
| 10,070,748 B2 | 9/2018 | Hanley |
| 10,092,126 B2 | 10/2018 | Baines |
| 10,094,167 B2 | 10/2018 | Odish |
| 10,123,647 B1 | 11/2018 | Mustafa |
| D834,925 S | 12/2018 | Hanley |
| D834,926 S | 12/2018 | Hanley |
| D834,927 S | 12/2018 | Hanley |
| D838,610 S | 1/2019 | Odish |
| D847,613 S | 5/2019 | Hanley |
| 10,278,529 B2 | 5/2019 | Baines |
| 10,285,527 B2 | 5/2019 | Mullet |
| D856,785 S | 8/2019 | Hanley |
| 10,376,086 B1 | 8/2019 | Mustafa |
| D858,259 S | 9/2019 | Hanley |
| D858,260 S | 9/2019 | Hanley |
| D859,963 S | 9/2019 | Hanley |
| 10,441,098 B2 | 10/2019 | Bruno |
| 10,448,773 B2 | 10/2019 | Muñiz |
| 10,648,492 B2 | 5/2020 | Hanley |
| 10,724,678 B1 | 7/2020 | Elliott |
| D893,284 S | 8/2020 | Hanley |
| 10,765,247 B2 | 9/2020 | Moss |
| 11,002,302 B2 * | 5/2021 | Hanley .................. A47H 1/142 |
| 11,092,176 B2 | 8/2021 | Hanley |
| 11,111,942 B2 | 9/2021 | Cogburn |
| 11,266,263 B2 | 3/2022 | Moss |
| 11,452,398 B2 | 9/2022 | Berman |
| 11,608,628 B2 | 3/2023 | Allen |
| 11,624,390 B2 * | 4/2023 | Cogburn .................. A47G 1/17 |
| | | 248/547 |
| 11,805,931 B2 | 11/2023 | Berman |
| 11,812,883 B2 * | 11/2023 | Hanley .................. A47H 1/122 |
| 2002/0066842 A1 | 6/2002 | Curry |
| 2003/0071181 A1 | 4/2003 | Valiulis |
| 2004/0159766 A1 | 8/2004 | Skorka |
| 2004/0195477 A1 | 10/2004 | Rivellino |
| 2005/0218284 A1 | 10/2005 | Kurrasch |
| 2006/0130983 A1 | 6/2006 | Nien |
| 2008/0156952 A1 | 7/2008 | Nathan |
| 2008/0237434 A1 | 10/2008 | Lin |
| 2009/0101609 A1 | 4/2009 | Batshon |
| 2009/0193938 A1 | 8/2009 | Mentor |
| 2010/0224749 A1 | 9/2010 | Tran |
| 2012/0001039 A1 | 1/2012 | Mcduff |
| 2012/0217362 A1 | 8/2012 | Affonso |
| 2013/0043357 A1 | 2/2013 | Mcleod |
| 2013/0082017 A1 | 4/2013 | Tang |
| 2013/0099080 A1 | 4/2013 | Baines |
| 2013/0200024 A1 | 8/2013 | Lindo |
| 2013/0341474 A1 | 12/2013 | Baines |
| 2014/0360960 A1 | 12/2014 | Didehvar |
| 2015/0108304 A1 | 4/2015 | Larsen Roldan |
| 2015/0265086 A1 | 9/2015 | Hanley |
| 2015/0272353 A1 | 10/2015 | Christodoulou |
| 2015/0297038 A1 | 10/2015 | Vaccaro |
| 2016/0113447 A1 | 4/2016 | Walker |
| 2016/0215922 A1 | 7/2016 | Mcduff |
| 2016/0286999 A1 | 10/2016 | Mcmillion |
| 2017/0071390 A1 | 3/2017 | Moss |
| 2018/0014680 A1 | 1/2018 | Hanley |
| 2018/0064279 A1 * | 3/2018 | Hanley .................. F16B 45/00 |
| 2018/0098656 A1 | 4/2018 | Baines |
| 2018/0199747 A1 | 7/2018 | Moss |
| 2018/0306219 A1 | 10/2018 | Hanley |
| 2019/0063671 A1 | 2/2019 | Mcduff |
| 2019/0099034 A1 | 4/2019 | Hanley |
| 2019/0282017 A1 | 9/2019 | Hanley |
| 2020/0200199 A1 | 6/2020 | Hanley |
| 2020/0217338 A1 | 7/2020 | Hanley |
| 2020/0305629 A1 | 10/2020 | Hanley |
| 2020/0325925 A1 | 10/2020 | Cogburn |
| 2020/0345167 A1 | 11/2020 | Klowan |
| 2021/0219764 A1 * | 7/2021 | Berman .................. A47H 1/142 |
| 2021/0252678 A1 | 8/2021 | Jason |
| 2021/0364027 A1 | 11/2021 | Cogburn |
| 2023/0165396 A1 | 6/2023 | Berman |
| 2024/0032717 A1 | 2/2024 | Berman |
| 2024/0108159 A1 * | 4/2024 | Moss .................. A47H 1/142 |

OTHER PUBLICATIONS

U.S. Appl. No. 17/890,106, filed Aug. 17, 2022.
U.S. Appl. No. 16/749,770, filed Jan. 22, 2020, 43 pages.
U.S. Appl. No. 17/879,640, filed Aug. 2, 2022, 17 pages.
U.S. Appl. No. 17/951,709, filed Sep. 23, 2022, 26 pages.
U.S. Appl. No. 17/964,736, filed Oct. 12, 2022.

* cited by examiner

MOUNTING BRACKET

CROSS-REFERENCE TO RELATED APPLICATIONS

This application is related to U.S. application Ser. No. 17/964,736, filed Oct. 12, 2022, U.S. application Ser. No. 17/951,709, filed Sep. 23, 2022, and U.S. application Ser. No. 17/890,106, filed Aug. 17, 2022, which are all hereby incorporated herein by reference in their entireties.

FIELD

This disclosure relates to mounting brackets and, in particular, to mounting brackets for wall mounted items.

BACKGROUND

Many buildings include wall mounted hardware, for example, curtain rod systems. Installation of curtain rod systems can be difficult and cumbersome, particularly for installers, such as homeowners, attempting to mount such curtain rod systems. For example, for many curtain rod systems, to securely mount the curtain rod system to a wall requires the installer to follow several steps and may require the use of several different types of tools or fasteners. Moreover, while attempting to install the curtain rod system, the installer may find that due to special circumstances the curtain rod system is not able to be mounted to the wall according to the mounting method specified in the instructions. Installers installing such wall mounted hardware desire hardware that can be easily installed in a wide variety of applications and that remains firmly secured to the wall during use.

DETAILED DESCRIPTION

Figure 1:
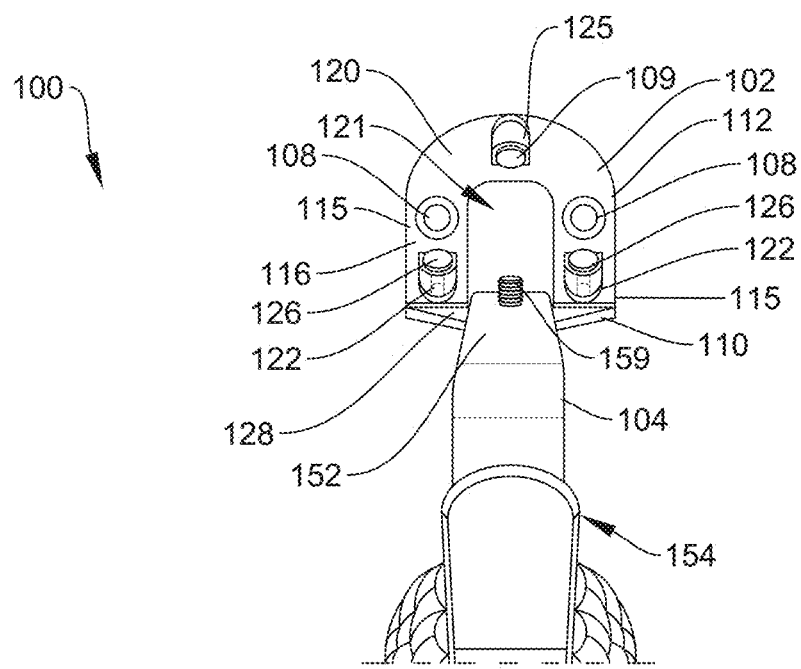
FIG. 1 is a top perspective view of a rod bracket.
Figure 2:
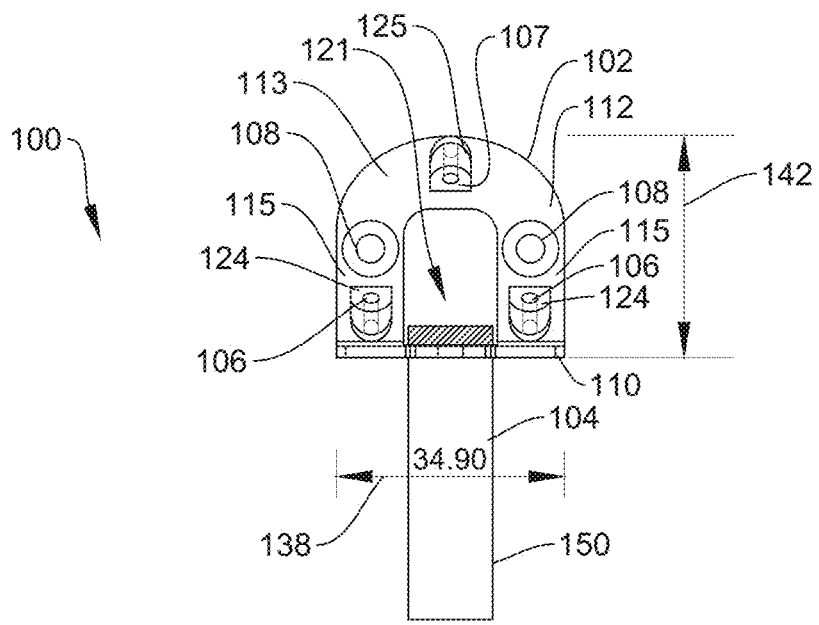
FIG. 2 is a front cross-section view of the rod bracket of FIG. 1.
Figure 3:
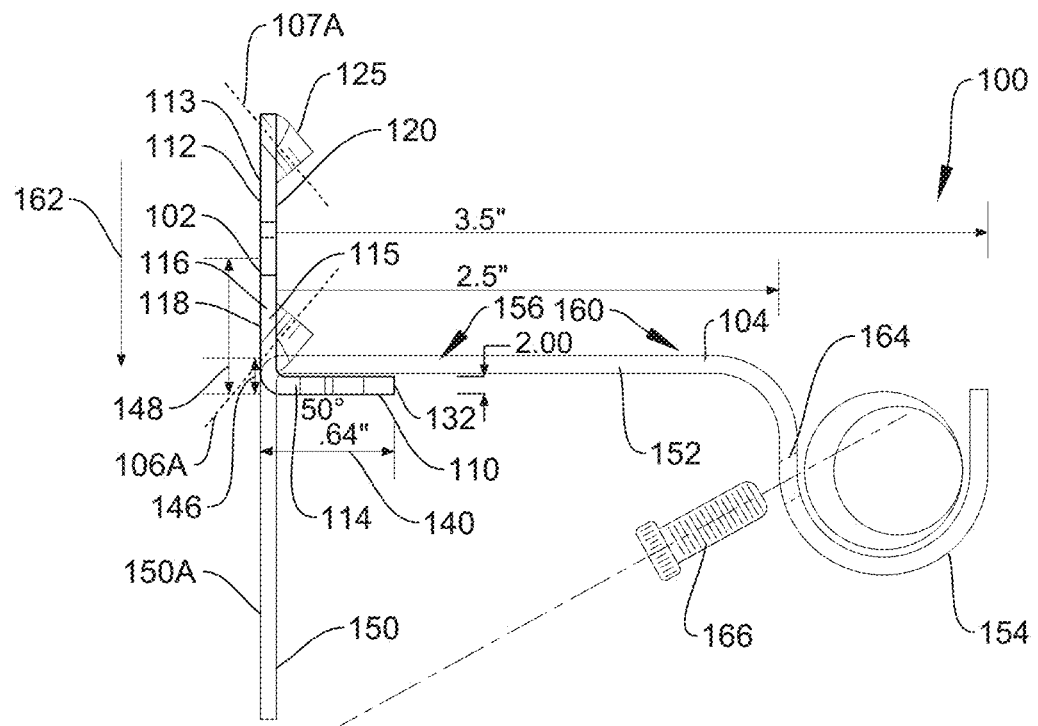
FIG. 3 is a left side elevation view of the rod bracket of FIG. 1
Figure 4:
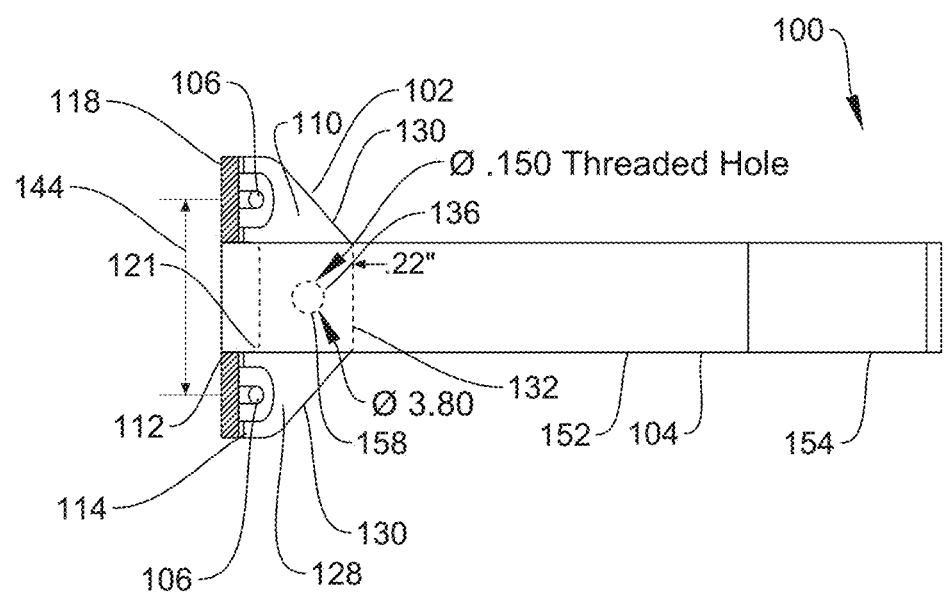
FIG. 4 is a top cross-section view of the rod bracket of FIG. 1.
Figure 5:
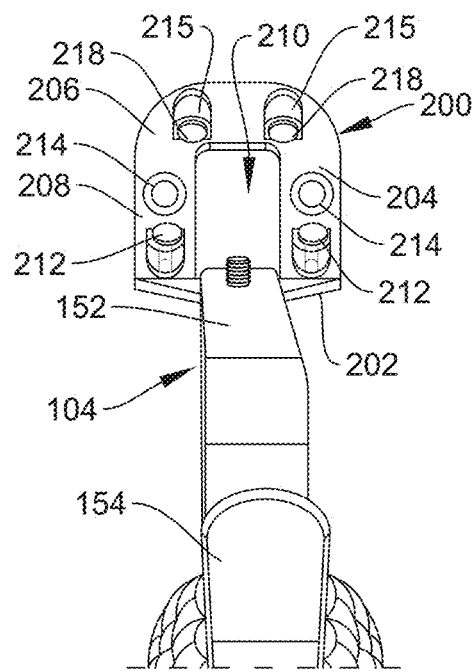
FIG. 5 is a top perspective view of another rod bracket.
Figure 6:
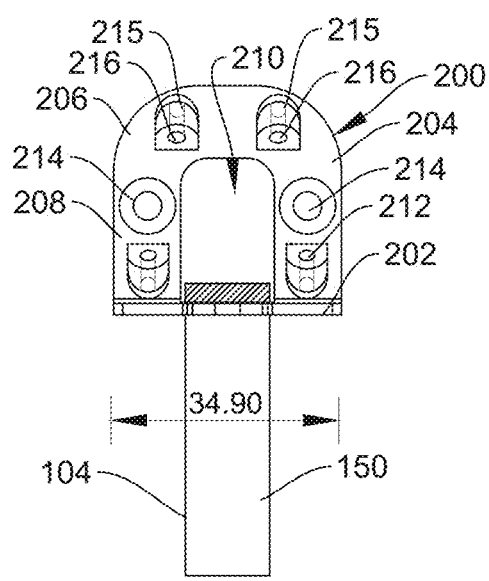
FIG. 6 is a front cross-section view of the rod bracket of FIG. 5.
Figure 7:
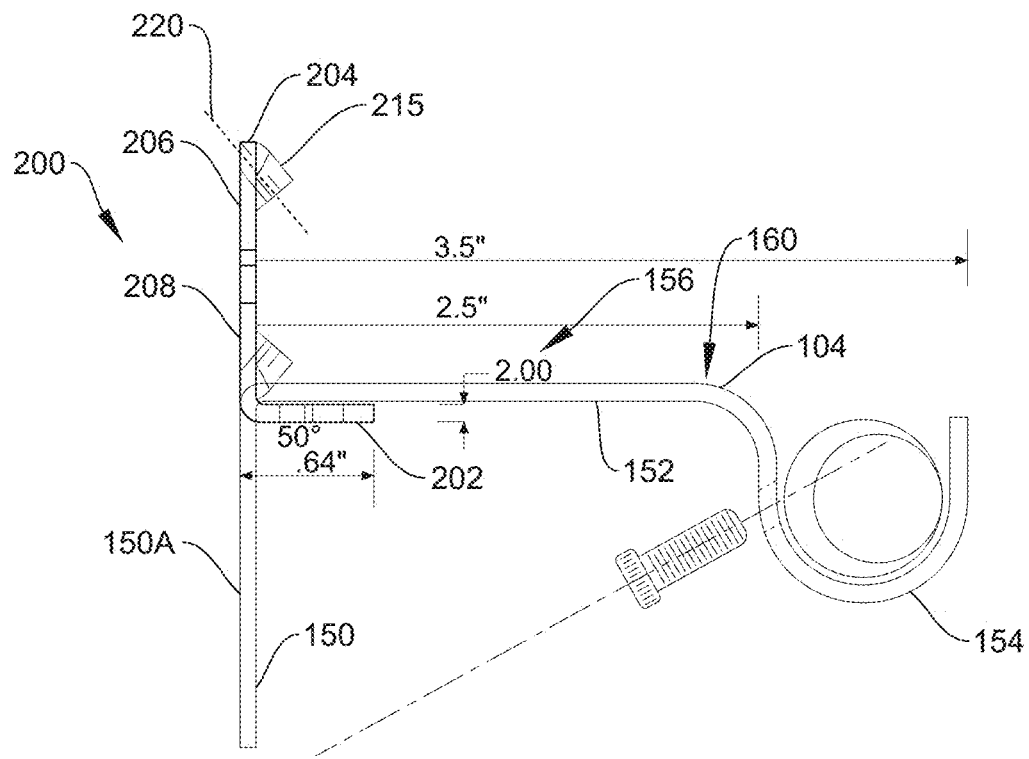
FIG. 7 is a left side elevation view of the rod bracket of FIG. 6
Figure 8:
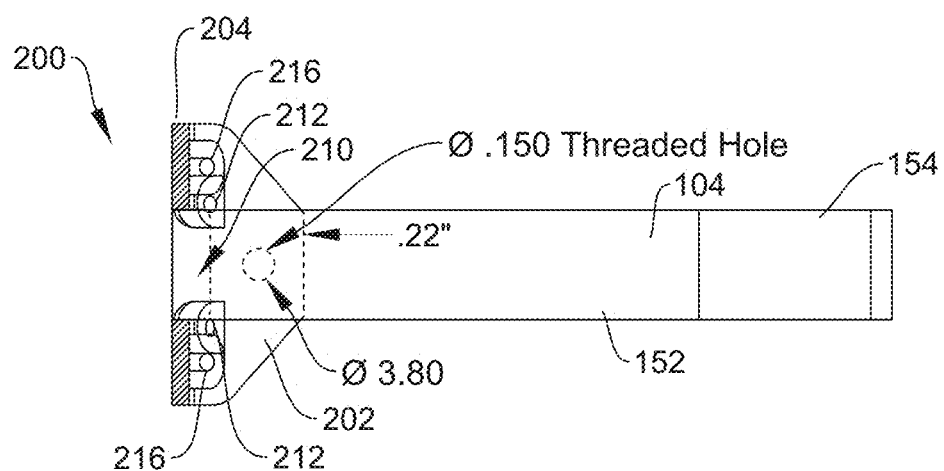
FIG. 8 is a top cross-section view of the rod bracket of FIG. 7.

With reference to FIGS. 1-4, a bracket 100 is provided. The bracket 100 may be used with another bracket 100 to support a rod, such as sheer or drapery rod, across the two brackets 100. The bracket 100 includes a mounting bracket 102 and hardware component such as a rod holder 104. While the discussion below primarily describes the bracket 100 including the rod holder 104, other hardware components may similarly be mounted to the mounting bracket 102, including baskets, lights, shelf supports, toilet paper holders, wall-decor, and other wall mounted hardware.

The mounting bracket 102 defines a first set of mounting holes 106. The first set of mounting holes 106 are spaced horizontally from one another at a mounting portion of the mounting bracket 102 and to be generally at or above the rod holder 104 when the rod holder 104 is combined with the mounting bracket 102. The first set of mounting holes 106 extend obliquely through the mounting bracket 102 to guide a fastener into a mounting structure (e.g., wall) at an oblique angle. For example, the first set of mounting holes 106 may direct the fasteners at a downward angle into the mounting structure (e.g., 50 degrees relative to a rear surface of the mounting bracket) which increases the amount of weight the bracket 100 can bear once mounted to the mounting structure. It has also been found that having the mounting holes at the top of the mounting bracket 102 (and generally at or above the rod holder 104) and spaced laterally from one another increases the load capacity of the bracket 100 over traditional L-shaped brackets, where the mounting holes are aligned vertically and located below the arm.

The mounting bracket 102 includes an upper mounting hole 107 that may be positioned in an upper end portion of the mounting bracket 102, that is, above the first pair of mounting holes 106. The upper mounting hole 107 extends obliquely through the mounting bracket 102 to guide a fastener 109 (e.g., a nail) into a mounting surface at an oblique angle. For example, the upper mounting hole 107 may direct the fastener at an upward angle into the mounting structure (e.g., 30-70 degrees relative to a rear surface of the mounting bracket), which further increases the amount of weight the bracket 100 can bear once mounted to the mounting structure. One angle could be approximately 40-degrees relative to a rear surface of the mounting bracket 102. One angle could be approximately 50-degrees relative to a rear surface of the mounting bracket 102. The upper mounting hole 107 may be used in addition to the first set of mounting holes 106 to increase the load the mounting bracket 102 is able to bear. Extending the fastener 109 upwardly into the mounting surface aids to inhibit the upper end portion of the mounting bracket 102 from pulling away or separating from the mounting structure, when a load is applied to the mounting bracket 102. In other words, the upwardly extending fastener 109 inhibits the mounting bracket 102 from pivoting away from the mounting structure about the lower end of the mounting bracket 102.

The mounting bracket 102 may further include a second set of mounting holes 108. The second set of mounting holes 108 are also spaced horizontally from one another at the mounting portion of the mounting bracket 102 and generally at or above the rod holder 104 which, as discussed above, increases the load capacity of the bracket 100 over traditional L-shaped brackets. The second set of mounting holes 108 are not angled and extend substantially perpendicularly through the mounting bracket 102. Fasteners (e.g., screws or nails) may be inserted through the second set of mounting holes 108 and into the mounting structure to secure the mounting bracket 102 to the mounting structure. Having two sets of mounting holes 106, 108 provides the installer with options for attaching the mounting bracket 102 to a mounting surface. Thus, for example, in applications where the first set of mounting holes 106 cannot be used, the installer may use the second set of mounting holes 108, rather than seeking a different bracket 100. The upper mounting hole 107 may also be used in conjunction with the second set of mounting holes 108 to increase the load the bracket 100 is able to bear, as discussed above.

The mounting bracket 102 includes a supporting portion, such as main body 110, and a mounting portion 112 extending from the main body 110. The mounting portion 112 has a bridge portion 113 and legs 115 extending from the main body 110. The legs 115 extend substantially parallel to one another and are spaced apart from one another forming a gap 121 therebetween that is sized to receive an attachment portion 156 of the rod holder 104, as discussed below. Each leg 115 of the mounting portion 112 includes a first segment 114 and a second segment 116 that extends at an angle from the first segment 114. The second segment 116 extends from the first segment 114 to the plate portion 113. The first segment 114 extends in the same plane as the main body 110, and the second segment 116 extends upward generally perpendicular to the first segment 114.

Each second segment 116 defines one of the mounting holes 106 and one of the mounting holes 108. The bridge portion 113 defines the upper mounting hole 107. The second segments 116 and the bridge portion 113 include a rear surface 118 that is positioned against a mounting surface of a structure (e.g., a wall) when the mounting bracket 102 is secured to the mounting structure. The rear surface 118 may be generally planar to extend substantially parallel to the mounting surface. The bridge portion 113 and the second segments 116 further include a front surface 120 opposite the rear surface 118.

As illustrated, the mounting holes 106, 108 are located on the second segments 116 laterally outside of the rod holder 104, one of each pair of mounting holes 106, 108 on each side of the rod holder 104. More specifically, one hole 106 is located on one second segment 116 outside the gap 121 and the rod holder 104 on one side, and the other hole 106 is located on the other second segment 116 outside the gap 121 and the rod holder 104 on the other side. And similarly for the second pair of mounting holes 108, each hole 108 is located on one of the second segments 116 on laterally opposite sides of the gap 121 and the rod holder 104. The lateral spacing of the mounting holes 106, 108 has been found to increase the holding strength of the bracket 100. As illustrated, the mounting holes 106, 108 are above the rod holder 104 which also has been found to increase the load capacity of the bracket 100. The mounting holes 106, 108 also are located at the top of the bracket 100 for ease of mounting.

The mounting bracket 102 includes a protrusion 122 extending obliquely from the front surface 120 of each of the second segments 116 of the legs 115. The protrusions 122 terminate at end faces 124 and define at least in part the mounting holes 106. The mounting holes 106 are passages extending through the protrusions 122 (perpendicular to the end face 124) and through the rear surface 118 at the legs 115. The mounting holes 106 may extend obliquely to the front surface 120 and/or the rear surface 118 of the second segment 116 of the legs 115. The mounting holes 106 may extend at an angle of approximately 40-60 degrees relative to the rear surface 118. As one specific example, the mounting holes 106 may extend at approximately 50 degrees relative to the rear surface 118.

The mounting holes 106 are sized to receive fasteners 126, such as, for example, nails or screws, therethrough for securing the mounting bracket 102 to a mounting structure, such as a wall or a door. The first pair of mounting holes 106 may be positioned above the first segment 114 of the legs 115 to provide space for an installer to drive the fasteners through the first pair of mounting holes 106. For example, a user may use a hammer to drive a nail through the mounting holes 106. Spacing the mounting holes 106 from the main body 110 and first segment 114 of the legs 115 provides clearance for using the hammer. The orientation of the mounting holes 106 through the legs 115 guides or directs the fasteners 126 as they are extended into the mounting structure such that the fasteners 126 extend into the mounting structure at an oblique angle (along line 106A of FIG. 3). For example, once inserted through the mounting holes 106, the fasteners 126 extend from the mounting bracket 102 obliquely to the rear surface 118. Including the protrusions 122 on the front surface 120 of the second segment 116 increases the length of the mounting holes 106 which aids in holding and guiding the fasteners at an angle relative to the mounting surface as the fasteners are extended into the mounting structure. Extending the fasteners 126 into the mounting structure at a downward angle (e.g., 50 degrees) increases the amount of weight the mounting bracket 102 can bear once mounted to the mounting surface.

The bridge portion 113 of the mounting portion 112 may include a protrusion 125 extending from the plate portion 113. The protrusion 125 defines the upper mounting hole 107 that extends at an oblique angle through the mounting portion 112 to guide a fastener extended therethrough into mounting structure (e.g., a wall) at an oblique angle (along line 107A). The upper mounting hole 107 may extend in a direction generally opposite the first set of mounting holes 106. For example, the upper mounting hole 107 may guide the fastener upward into the mounting structure, whereas the mounting holes 106 guide the fasteners downward into the mounting structure. The upper mounting hole 107 may be in the center of the mounting bracket 102 and aligned with the gap 121.

The mounting bracket 102 includes the second pair of mounting holes 108 that may be used for mounting the mounting bracket 102 to a mounting structure. The mounting holes 108 extend from the front surface 120 and through the rear surface 118. The mounting holes 108 may extend through the second segment 116 of the legs 115 substantially perpendicular to the rear surface 118. Fasteners may extend through the holes 108 and into the mounting structure to secure the mounting bracket 102 to the mounting structure. As an example, where the mounting structure is drywall, wall anchors may be inserted into the drywall and screws may be extended through the mounting holes 108 and into the wall anchors to attach the mounting bracket 102 to the wall. The rear surface 118 may include recesses about the mounting holes 108. These recesses may receive, for example, a portion or more of a wall anchor extending from the mounting surface of the mounting structure to ensure the rear surface 118 is able to lay flat on the mounting surface. The mounting holes 108 may be used to mount the mounting bracket 102 to a mounting structure as an alternative mounting method or in addition to using the mounting holes 106 of the protrusions 122 and/or the upper mounting hole 107 of the protrusion 125. For example, in some applications, an installer may not be able to use the first pair of mounting holes 106 and, instead, may use the second pair of mounting holes 108. For instance, a wall may not be able to accept nails extended through the first set of mounting holes 106 (e.g., where the wall is concrete, metal, or brick) but may be able to accept screws extended through the second set of mounting holes 108 into the wall. Thus, the mounting bracket 102 can be installed according to multiple different approaches enabling the mounting bracket to be installed in a greater variety of applications. The second mounting holes 108 may be positioned above the protrusions 122 having the first mounting holes 106. In other forms, the second mounting holes 108 are positioned below the protrusions 122 having the first mounting holes 106.

The main body 110 may be a plate and/or may have a substantially planar support surface 128 on an upper side thereof. The sides 130 of the main body 110 may angle inward from the legs 115 to a front end 132 such that the main body 110 has a substantially trapezoidal shape. The gap 121 is defined between the legs 115. The gap 121 is sized to receive a portion of the rod holder 104, as described further below. The main body 110 may define a threaded hole 136 used to secure the mounting bracket 102 and the rod holder 104 together. The mounting bracket 102 may be formed of a rigid material, such as a plastic or a metal.

In one non-limiting example, the mounting bracket 102 has a width 138 of 34.90 millimeters (mm), a depth 140 of 16.26 mm, and a height 142 of 34.3 mm. The lateral spacing 144 between the centers of the mounting holes 106, 108 may be 24.27 mm. The height 146 of the first set of mounting holes 106 exiting the rear surface 118 of the second segment 116 of the legs 115 may be 4.3 mm. The height 148 of the second set of mounting holes 108 may be 17 mm.

The rod holder 104 includes a base portion, such as a leg 150, a support arm 152, and a receptacle, such as a cradle 154. The leg 150 and a portion of the support arm 152 form an attachment portion 156 of the rod holder 104. The leg 150 and the support arm 152 are angled relative to one another, such as at 90 degrees. The leg 150 is sized to extend through the gap 121 of the mounting bracket 102. The leg 150 has a rear surface 150A that is designed to contact and/or extend along the mounting surface when attached to the mounting bracket 102 to counter the force applied at the cradle 154 of the rod holder 104 (e.g., by a rod or drapes hanging from the rod). The support arm 152 is designed to rest on the main body 110 of the mounting bracket 102. The support arm 152 defines a hole 158 that aligns with the hole 136 of the main body 110 of the mounting bracket 102. A fastener, such as a screw 159, may be extended through the holes 136, 158 to affix the support arm 152 to the main body 110. The hole 158 of the support arm 152 may be a threaded hole.

A portion of the support arm 152 and the cradle 154 form a support portion 160 of the rod holder 104. The support arm 152 extends from an end of the leg 150 to the cradle 154. The cradle 154 has an arcuate shaped surface that is sized to receive and support a rod (e.g., a curtain rod). The cradle 154 may include a threaded hole 164 into which a screw 166 may be threaded to clamp and secure the rod in the cradle 154. The rod holder 104 may be formed of a rigid material such as a plastic or a metal.

The bracket 100 may be attached to a mounting structure, for example, to support a rod. The mounting bracket 102 may be positioned on the mounting surface of the mounting structure at a desired location. Fasteners 126 may be extended through each of the first pair of mounting holes 106 and into the mounting structure to secure the mounting bracket 102 to the mounting structure. The mounting holes 106 extend obliquely to the rear surface 118 of the legs 115 (along line 106A of FIG. 3) and guide the fasteners at a downward angle as they extend into the mounting structure. A fastener 109 may also be extended through the upper mounting hole 107 and into the mounting structure to aid in securing the mounting bracket 102 to the mounting structure. Use of the upper mounting hole 107 may aid to inhibit the upper end portion of the mounting portion 112 of the mounting bracket 102 from pulling away from the mounting structure when the bracket 100 is under load.

Alternatively, fasteners may be extended through the second pair of mounting holes 108 and into the mounting structure to secure the mounting bracket 102 to the mounting structure. A fastener may also be extended through the upper mounting hole 107 as described above to aid in securing the mounting bracket 102 to the mounting structure.

In some approaches, fasteners may be extended through each of the holes of the sets of mounting holes 106, 108 and the upper mounting hole 107 to secure the mounting bracket 102 to the mounting structure. In some approaches, fasteners may be extended through the upper mounting hole 107 and one hole of the first pair of mounting holes 106 and one hole of the second pair of mounting holes 108 of opposite legs 115 to secure the mounting bracket 102 to the mounting structure.

The rod holder 104 may then be attached to the mounting bracket 102. The leg 150 may be moved in direction 162 to insert the leg 150 through the gap 121 between the legs 115 and between the main body 110 and the mounting surface. The leg 150 may be moved in direction 162 until the support arm 152 rests on the main body 110 of the mounting bracket 102. The leg 150 may be moved rearward to position the rear surface 150A of leg 150 against the mounting surface. The engagement of leg 150 against the mounting surface may inhibit the rod holder 104 from pivoting substantially relative to the mounting bracket 102 by countering the force applied to the cradle 154 by weight of the rod and/or items supported by the rod (e.g., a curtain). A fastener, such as the screw 159, may be extended through the hole 158 of the support arm 152 and through hole 136 of the mounting bracket 102 to secure the rod holder 104 to the mounting bracket 102. A rod may be positioned to extend through the cradle 154 to be supported by the bracket 100. The screw 166 may be extended through the hole 164 of the cradle 154 to clamp and secure the rod in the cradle 154.

In other embodiments, other types of hardware components may be mounted to the mounting bracket similar to the rod holder 104 described above. For example, baskets, lights, shelf supports, toilet paper holders, and other wall mounted hardware may be mounted to the wall using the mounting bracket 102. The hardware components may include an attachment portion for mounting the hardware to the mounting bracket 102 where the attachment portion has, for example, a leg and support arm similar to the rod holder 104.

With respect to FIGS. 5-8, a mounting bracket 200 is provided according to another embodiment. The mounting bracket 200 is similar in many respects to the mounting bracket 102 discussed above such that the differences will be highlighted, and the discussion of similar features will not be repeated. The mounting bracket 200 may be used with the rod holder 104 as described above with respect to the mounting bracket 102.

The mounting bracket 200 includes a supporting portion, such as main body 202, and a mounting portion 204 extending from the main body 202. The mounting portion 204 has a bridge portion 206 and legs 208 extending from the main body 202. The legs 208 extend substantially parallel to one another and are spaced apart from one another forming a gap 210 therebetween that is sized to receive the attachment portion 156 of the rod holder 104 as discussed above. The mounting portion 204 may include a first set of mounting holes 212 and a second set of mounting holes 214 similar to the holes 106, 108 discussed above.

The mounting portion 204 of the mounting bracket 200 may further include a set of mounting holes 216 that may each be similar to the upper mounting hole 107 described above. The upper mounting holes 216 may be positioned in the bridge portion 206 of the mounting bracket 200, above the first and second sets of mounting holes 212, 214. The mounting holes 216 may be spaced apart laterally from one another on the bridge portion 206. For example, the mounting holes 216 may be positioned at or about opposite sides of the gap 210. The mounting holes 216 extends obliquely through the mounting bracket 200 to guide a fastener 218 (e.g., a nail) into a mounting structure at an oblique angle. For example, the mounting holes 216 may direct the fastener at an upward angle (e.g., 30-70 degrees) into the mounting surface (along line 220), which increases the amount of weight the bracket 100 can bear once mounted to the mounting structure. One angle could be approximately 40-degrees. As another example, the angle could be approximately 50-degrees. The bridge portion 206 of the mounting portion 204 may include protrusions 215 extending from the plate portion 206. The protrusions 215 define the upper mounting holes 216 that extend obliquely through the mounting portion 204 to guide the fasteners 218 extended therethrough into mounting structure (e.g., a wall) at the oblique angle. The protrusions 215 may provide thickness through which the holes 216 extend which aids to hold the fasteners 218 at the oblique angle during insertion into the mounting surface.

Extending the fasteners 218 upwardly into the mounting surface aids to inhibit the bridge portion 206 of the mounting bracket 200 from pulling away or separating from the mounting surface, for example, when a load is applied to the mounting bracket 200. In other words, the upwardly extending fasteners 218 inhibit the mounting bracket 200 from pivoting away from the mounting surface about the lower end of the mounting bracket 200. It has also been found that having the upper mounting holes 216 at the top of the mounting bracket 200 (and above the rod holder 104) and spaced laterally from one another increases the load capacity of the mounting bracket 200 over traditional L-shaped brackets where the mounting holes are aligned vertically and located below the arm.

The mounting holes 216 may be used in addition to the first and/or second set of mounting holes 212, 214 to increase the load the mounting bracket 200 is able to bear.

Figures 9, 10:
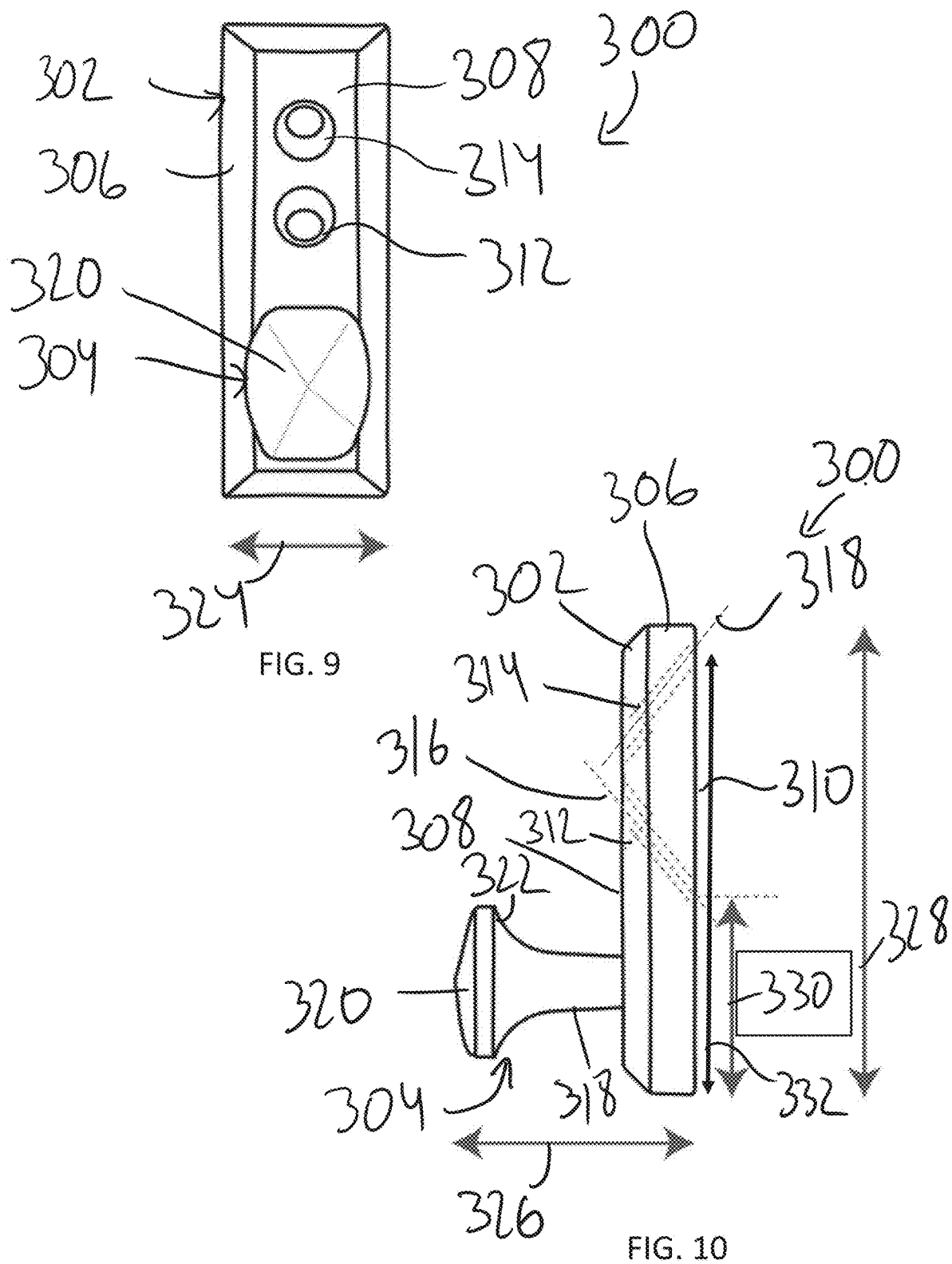
FIG. 9 is a front elevation view of another bracket.
FIG. 10 is a side elevation view of the bracket of FIG. 9.

With respect to FIGS. 9-10, a bracket 300 is provided according to another embodiment. The bracket 300 includes a base 302 and a support arm 304 extending from the base 302. In some forms, the base 302 and the support arm 304 are formed unitarily or as a single piece. In some forms, the base 302 and support arm 304 are separate pieces attached together (e.g., with a fastener).

The base 302 includes a mounting portion 306 having a front surface 308 and a rear surface 310 opposite the front surface 308. The rear surface 310 is profiled to engage a mounting structure (e.g., a wall or door). The mounting portion 306 defines a first mounting hole 312 and a second mounting hole 314. The first mounting hole 312 extends through the mounting portion 306 at a downward angle from the front surface 308 to the rear surface 310. The second mounting hole 314 extends through the mounting portion 306 at an upward angle from the front surface 308 to the rear surface 310. In other forms, the mounting portion 306 may include a plurality of first mounting holes 312 extending downwardly and/or a plurality of second mounting holes 314 extending upwardly.

The first mounting hole 312 and second mounting hole 314 are sized to receive a fastener (e.g., a screw, nail) and guide the fastener into the mounting structure at an angle. The first mounting hole 312 guides the fastener along line 316 at an oblique, downward angle relative to the rear surface 310 and into the mounting surface at the oblique, downward angle. The first mounting hole 312 may extend at an angle of about 30-70 degrees relative to the rear surface 310 of the mounting portion 306. As one specific example, the first mounting hole 312 extends at an angle of 50 degrees relative to the rear surface 310.

The second mounting hole 314 guides the fastener along line 318 at an oblique, upward angle relative to the rear surface 310 and into the mounting surface at the oblique, upward angle. The second mounting hole 314 may extend at an angle of about 30-70 degrees relative to the rear surface 310 of the mounting portion 306. As one specific example, the second mounting hole 314 extends at an angle of 40 degrees relative to the rear surface 310. The second mounting hole 314 may be positioned at the top portion of the base 302. The second mounting hole 314 may be above the first mounting hole 312. Extending a fastener through the upwardly extending second mounting hole 314 may increase the load the bracket 300 is able to bear. For instance, extending a fastener upwardly into the mounting structure aids to inhibit the upper end portion of the base 302 from pulling away or separating from the mounting structure when a load is applied to the bracket 300. In other words, the upwardly extending fastener inhibits the bracket 300 from pivoting away from the mounting structure about the lower end of the bracket 300.

The mounting portion 306 may have a thickness sufficient to provide the first and second mounting holes 310, 312 with lengths to hold the fasteners at the oblique angle during insertion into the mounting surface. The first mounting hole 312 and/or second mounting hole 314 may include a chamfer about the first and second mounting holes 312, 314 on the front surface 308. The chamfer may guide an end of the fastener into the holes 312, 314 when the fastener is being inserted therein. The chamfer may also provide space for a head of the fastener to reside once inserted through the base 302 and into the mounting structure.

The support arm 304 extends outward from the front surface 308 of the base 302. The support arm 304 may include an arm portion 318 and a hook portion 320. The arm portion 318 may extend from the base 302 to the hook portion 320. The hook portion 320 may include a flanged end portion, knob, or hook that provides a hooking surface 322 at an end of the arm portion 318 to retain an item on the arm portion 318. An item may be hung or supported by the support arm 304. For example, an item (e.g., a coat, towel, hanger, picture frame, and wall decor) may rest on or be supported by the arm portion 318 of the support arm 318. The hook portion 320 may retain the item on the arm portion 318 and inhibit the item from sliding off the arm portion 318 when the item is moved away from the base 302.

The support arm 304 may be positioned at a lower end of the base 302. For example, the support arm 304 may be positioned below the first mounting hole 312 and/or second mounting hole 314. When a load is applied to the support arm 304 (when an item is supported by the bracket 300), the bracket 300 may be pivoted slightly such that the lower end of the bracket 300 is forced against the mounting structure and the upper portion of the bracket 300 is moved outward from the mounting structure. The upwardly extending fastener extending through the second mounting hole 314 into the mounting structure counters the upper portion of the bracket 300 from moving away from the wall under the load as discussed with respect to the embodiments above.

In one non-limiting example, the bracket 300 has a width 324 of 12.2 mm, a depth 326 of 7.8 mm, and a height 328 of 34.3 mm. The height 330 of the first mounting hole 312 exiting the rear surface 312 may be 14.75 mm. The height 332 of the second mounting hole 314 exiting the rear surface 312 may be 32.5 mm.

While there have been illustrated and described embodiments of the present invention, those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A bracket comprising:
a base having a supporting portion and a mounting portion extending at an angle to the supporting portion, the supporting portion having an upper support surface, the mounting portion having a first surface profiled to engage a structure and a second surface opposite the first surface, the mounting portion defining one or more first mounting holes sized to receive a fastener for mounting the base to a structure, the one or more first mounting holes extending upwardly at an oblique angle through the mounting portion in a direction from the second surface to the first surface, the base defining a gap; and
a support arm being sized to contact the upper support surface of the base and extend through the gap of the base.

2. The bracket of claim 1 wherein the mounting portion includes one or more protrusions extending therefrom, each of the one or more first mounting holes extending through a protrusion of the one or more protrusions.

3. The bracket of claim 1 wherein the support arm has a first width at an interconnection with the base, the first width being less than a second width of the gap such that a first portion of the base is on one side of the support arm and a second portion of the base is on an opposite side of the support arm.

4. The bracket of claim 1 wherein the one or more first mounting holes are located above a top of the support arm.

5. The bracket of claim 1 wherein the mounting portion includes one or more second mounting holes sized to receive a fastener for mounting the base to a structure.

6. The bracket of claim 5 wherein the mounting portion includes at least two legs, each of the at least two legs defining one of the one or more second mounting holes.

7. The bracket of claim 6 wherein the mounting portion includes a plate portion connecting the at least two legs, the plate portion defining the one or more first mounting holes.

8. The bracket of claim 6 wherein the at least two legs define the gap such that one of the at least two legs is outside of the support arm on one side of the support arm and one of the at least two legs is outside the support arm on an opposite side of the support arm.

9. The bracket of claim 6 wherein the at least two legs extend from the supporting portion of the base and space at least a portion of the supporting portion of the base from the structure.

10. The bracket of claim 5 wherein the one or more second mounting holes extend downwardly at an oblique angle through the mounting portion.

11. The bracket of claim 10 wherein the mounting portion further defines one or more third mounting holes sized to receive a fastener and extending perpendicular to the first surface.

12. The bracket of claim 10 wherein the one or more first mounting holes are above the one or more second mounting holes.

13. The bracket of claim 1 further comprising a support leg at an end of the support arm for being positioned against the structure.

14. The bracket of claim 13 wherein when the support leg is positioned against the structure, the support leg extends downward from the support arm along the structure.

15. The bracket of claim 1 further comprising a support leg at an end of the support arm, the support leg sized to be disposed between the structure and the supporting portion to contact the structure.

16. The bracket of claim 1 further comprising a receptacle for supporting a rod at an end of the support arm.

17. The bracket of claim 1 wherein the supporting portion includes a hole, and the support arm includes a corresponding hole for securing the support arm to the supporting portion.

18. A bracket comprising:
a base having a mounting portion, the mounting portion having a first surface profiled to engage a structure and a second surface opposite the first surface, the mounting portion including at least one first mounting hole extending upwardly at an oblique angle from the second surface to the first surface and at least one second mounting hole extending through the mounting portion at an angle different than the at least one first mounting hole, the at least one first mounting hole and the at least one second mounting hole sized to receive a fastener for mounting the base to the structure; and
a support arm extending from the base.

19. The bracket of claim 18 wherein the mounting portion includes at least one protrusion, the at least one first mounting hole extending through the at least one protrusion.

20. The bracket of claim 19 wherein the at least one protrusion has an angled face.

21. The bracket of claim 18 wherein the mounting portion comprises a plate portion and two legs extending from the plate portion to the supporting portion, the plate portion defining the at least one first mounting hole.

22. The bracket of claim 21 wherein each leg defines a mounting hole of the at least one second mounting hole.

23. The bracket of claim 18 wherein the at least one first mounting hole is above the at least one second mounting hole.

24. The bracket of claim 18 wherein the at least one second mounting hole extends downwardly through the mounting portion from the second surface to the first surface.

25. The bracket of claim 18 wherein the base defines a gap and the support arm includes an attachment portion extending through the gap.

26. The bracket of claim 25 wherein the support arm includes a hole and the base includes a supporting portion that includes a corresponding hole for securing the support arm to the supporting portion.

27. The bracket of claim 18 wherein the base includes a supporting portion, wherein the supporting portion is spaced from the structure by the mounting portion.

28. The bracket of claim 18 wherein the base includes a supporting portion extending at an angle relative to the mounting portion, the supporting portion of the base contacting the support arm to inhibit downward deflection of the support arm.

29. The bracket of claim 18 wherein the support arm extends from a lower end portion of the base, the at least one first mounting hole extending through an upper end portion of the base.

30. A method of mounting hardware to a surface, the method comprising:
- positioning a rear surface of a mounting portion of a mounting bracket against the surface, the mounting bracket including a supporting portion and the mounting portion extending from the supporting portion and spacing at least a portion of the supporting portion from the surface;
- attaching the mounting bracket to the surface by inserting a fastener through a mounting hole of the mounting portion of the mounting bracket in a direction from a front surface of the mounting portion toward the rear surface and into the surface upwardly at an oblique angle, the mounting hole extending obliquely relative to the rear surface of the mounting bracket to guide the fastener into the surface upwardly at the oblique angle; and
- connecting hardware to the mounting bracket including inserting an attachment portion of the hardware between the surface and the supporting portion of the mounting bracket and between a first portion and a second portion of the mounting portion until the attachment portion contacts the supporting portion, at least a portion of the mounting hole being located above a top of the attachment portion.

31. The method of claim 30 wherein connecting the hardware to the mounting bracket comprises fastening the attachment portion of the hardware to the supporting portion of the mounting bracket.

32. The method of claim 30 wherein connecting the hardware to the mounting bracket comprises positioning the attachment portion of the hardware to contact the surface.

33. The method of claim 30 wherein the hardware includes a receptacle opposite the attachment portion for receiving a rod.

* * * * *